(No Model.)
A. D. STRONG.
FILTER.
No. 550,544. Patented Nov. 26, 1895.
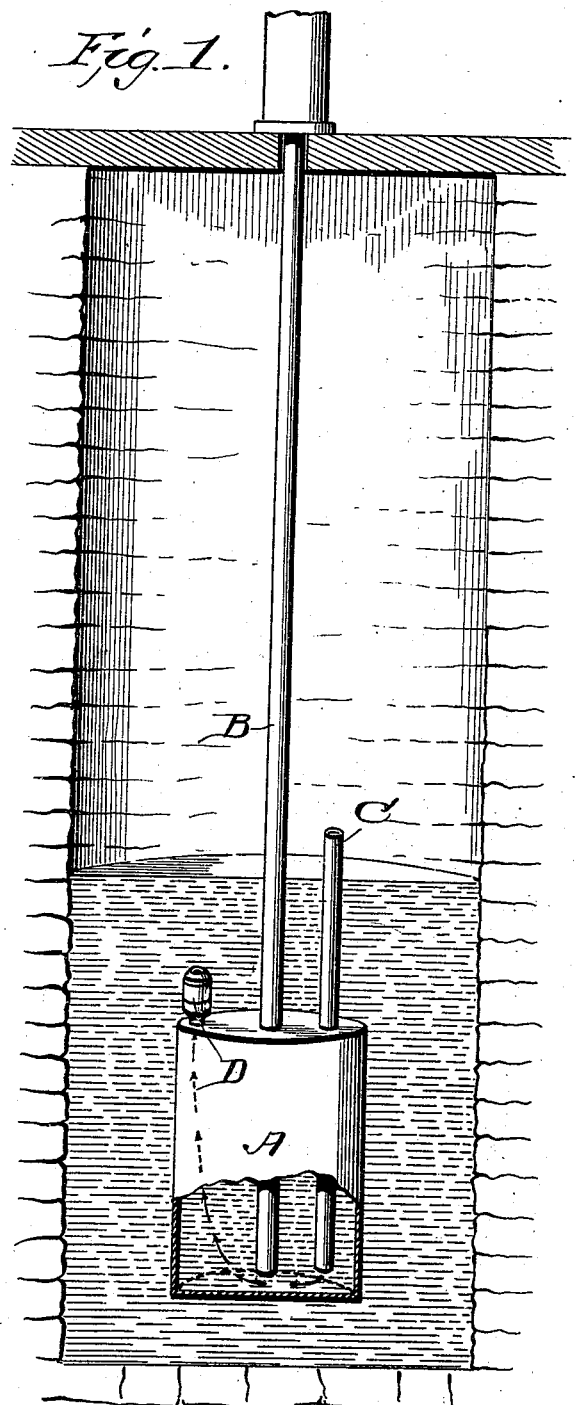
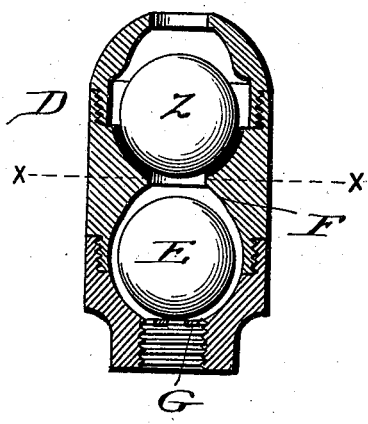
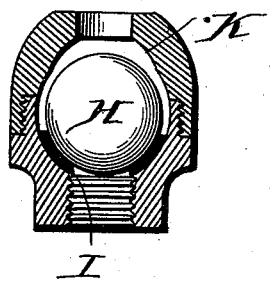
Inventor
Abner D. Strong,
By R. S. & A. P. Lacey
Attorneys
Witnesses

UNITED STATES PATENT OFFICE.

ABNER D. STRONG, OF ASHTABULA, OHIO.

FILTER.

SPECIFICATION forming part of Letters Patent No. 550,544, dated November 26, 1895.

Application filed May 15, 1894. Serial No. 511,353. (No model.)

*To all whom it may concern:*

Be it known that I, ABNER D. STRONG, a citizen of the United States, residing at Ashtabula, in the county of Ashtabula, State of Ohio, have invented certain new and useful Improvements in Filters; and I do hereby declare the following to be a full, clear, and exact description of the invention, such as will enable others skilled in the art to which it appertains to make and use the same.

This invention is an improved filter. It is also an improvement upon my Patent No. 498,586, dated May 30, 1893.

The object of this present invention is to improve the quality of potable water in closed filters wholly or in part submerged and in other closed receptacles wholly unsubmerged or wholly or in part submerged automatically by aeration and when entirely submerged to partially aerate the submerging water.

The invention consists of the novel features and peculiar construction of the parts, which will be hereinafter more fully described and claimed, and which are shown in the annexed drawings, of which—

Figure 1 is a perspective of a closed filter embodying my invention, a part being broken away to better show the details of construction. Fig. 2 is a vertical section through the center of the vertical check-valves, showing the downward and upward closing valves. Fig. 3 is a vertical section through the center, showing the upward and downward closing vertical check-valve.

In carrying out my invention I employ a closed filter A, which may be of any desired form, but is, preferably, cylindrical in shape, and in the present instance is a porous cylinder, through which the water percolates or diffuses.

The pipe B to connect with the pump is extended to near the bottom of the filter A and is connected at its upper end with any kind of a pump in any suitable location. The air-inlet pipe C passes into the filter and extends to near the bottom of the same, the top of said pipe extending above the highest high-water mark in a submerged filter or receptacle. The air-outlet pipe D has an upward-opening check-valve at its upper end to prevent the downward passage of either air or water and permit its upward flow. The ball-valve appears to be the best adapted for the purpose; but any of the ordinary check-valves which answers the purpose will do. This outlet-air pipe passes just through the top or highest part of the filter or receptacle.

The pipes B, C, and D, where they enter the filter or receptacle, are secured in any of the well-known and ordinary ways, so that neither water nor air can pass in or out around them.

The water can be drawn from the filter by a pump or gravity, as it is not material to this invention where the pipe B enters the filter or by what means the water is drawn. It is obvious, however, that if the water is not drawn from A faster than it can enter there will be no operation of this device. The aerating is accomplished automatically by the action of the pump or gravity. As the water is drawn from A periodically, the air enters the pipe C, passes down to near the bottom of A, and then up through the water to fill the partial vacuum above the water. As soon as the drawing of the water ceases and the filter begins to fill again, the air escapes through the air-outlet pipe D, and if the filter is entirely submerged it will partially aerate the submerging water.

When the filter and the valve on the air-outlet pipe D is submerged and the water is supplied by gravity or other pressure to prevent the water from passing out or overflowing, a special check-valve or combination of check-valves is required, as shown in Fig. 2, in which Z is the ordinary ball-check valve; E, a float-valve; F, its upward seat, and G its rest. The float-valve can be made of any suitable material, but rubber appears to be the best. The rest G is perforated or made of bars to permit the free passage of air and water. As soon as the air is all expelled and the water rises, it will lift the float-valve E into its seat F and stop the further rising.

When the air-outlet valve is unsubmerged, another construction is called for, as shown in Fig. 3, in which H is a float-valve, I its downward seat, and K its upward seat. As soon as the air is expelled and the water rises, it will lift the valve H into its seat K and stop further rising.

The special form of the valves is not material, and in Fig. 2 all below the broken line, with the part above the line removed, will permit the free downward flow of air and stop the upward flow of water by lifting the float-valve E from its rest G and the seat F; but the ball-valve appears to be the best. The pipes C and D may be located as convenience dictates, conditioned on accomplishing the desired object.

I am aware that drawing water from closed filters and receivers is common and that air-pipes to admit air into them and in a partial way aerate the submerging water is not new, and I therefore do not claim them broadly.

Having thus described my invention, what I claim, and desire to secure by Letters Patent, is—

The combination, with a filter, of a water discharge pipe leading therefrom, an air inlet pipe leading into the filter, an air outlet pipe arranged at the top of the filter, the ball check valve Z, arranged at the top of the said pipe, and the float valve E arranged below the check valve Z, substantially as and for the purpose described.

In testimony whereof I affix my signature in presence of two witnesses.

ABNER D. STRONG.

Witnesses:
THADDEUS E. HOYT,
FRED A. WILLIAMS.